(12) United States Patent
Thompson et al.

(10) Patent No.: US 9,384,905 B2
(45) Date of Patent: Jul. 5, 2016

(54) HIGH PERFORMANCE TRANSITION METAL CARBIDE AND NITRIDE AND BORIDE BASED ASYMMETRIC SUPERCAPACITORS

(75) Inventors: Levi T. Thompson, Northville, MI (US);
Paul Rasmussen, Ann Arbor, MI (US);
Saemin Choi, Ann Arbor, MI (US)

(73) Assignee: The Regents of the University of Michigan, University of Michigan Office of Technology Transfer, Ann Arbor, MI (US)

( * ) Notice: Subject to any disclaimer, the term of this patent is extended or adjusted under 35 U.S.C. 154(b) by 686 days.

(21) Appl. No.: 13/272,185

(22) Filed: Oct. 12, 2011

(65) Prior Publication Data
US 2012/0262842 A1    Oct. 18, 2012

Related U.S. Application Data

(60) Provisional application No. 61/392,311, filed on Oct. 12, 2010.

(51) Int. Cl.
| | |
|---|---|
| H01G 9/00 | (2006.01) |
| H01G 9/04 | (2006.01) |
| H01G 9/145 | (2006.01) |
| H01G 11/46 | (2013.01) |
| H01G 11/04 | (2013.01) |

(52) U.S. Cl.
CPC ............... *H01G 11/46* (2013.01); *H01G 11/04* (2013.01); *Y02E 60/13* (2013.01); *Y02T 10/7022* (2013.01)

(58) Field of Classification Search
CPC .... Y02E 60/13; Y02T 10/7022; H01G 9/058; H01G 9/155
USPC ................................ 361/502, 508, 516
See application file for complete search history.

(56) References Cited

U.S. PATENT DOCUMENTS

| | | | |
|---|---|---|---|
| 5,680,292 A * | 10/1997 | Thompson et al. | ........... 361/528 |
| 5,837,630 A | 11/1998 | Owens et al. | |
| 5,980,977 A * | 11/1999 | Deng | ................... H01G 9/0032 |
| | | | 427/376.2 |
| 6,380,627 B1 | 4/2002 | Weihs et al. | |
| 6,649,305 B1 | 11/2003 | Bugnet et al. | |

(Continued)

FOREIGN PATENT DOCUMENTS

| | | |
|---|---|---|
| WO | WO-96/19003 A1 | 6/1996 |
| WO | WO-97/16245 A1 | 5/1997 |

(Continued)

OTHER PUBLICATIONS

International Search Report and Written Opinion, corresponding international application No. PCT/US2011/056007, mailing date Aug. 27, 2012.

(Continued)

*Primary Examiner* — Eric Thomas
*Assistant Examiner* — Arun Ramaswamy
(74) *Attorney, Agent, or Firm* — Lempia Summerfield Katz LLC

(57) ABSTRACT

In accordance with an embodiment of the disclosure, an asymmetric supercapacitor includes a first active material with a high hydrogen over-potential and a second active material with a high oxygen over-potential. The first active material is based on a nitride, an oxynitride, a carbide, an oxycarbide, a boride, or an oxyboride of a metal selected from Groups III, IV, V, VI, and VII of the Periodic Table.

17 Claims, 15 Drawing Sheets

(56) References Cited

U.S. PATENT DOCUMENTS

| | | | |
|---|---|---|---|
| 6,908,711 | B2 | 6/2005 | Fauteux et al. |
| 6,926,969 | B2 | 8/2005 | Bohm et al. |
| 7,384,686 | B2 | 6/2008 | Penneau et al. |
| 7,835,136 | B2 | 11/2010 | Feaver et al. |
| 8,012,598 | B2 | 9/2011 | Naumann et al. |
| 2005/0265882 | A1 | 12/2005 | Naumann et al. |
| 2005/0272214 | A1 | 12/2005 | Chiang et al. |
| 2006/0280637 | A1 | 12/2006 | Naumann et al. |
| 2007/0243718 | A1 | 10/2007 | Shiratori et al. |
| 2008/0031767 | A1 | 2/2008 | Naumann et al. |
| 2008/0148940 | A1 | 6/2008 | Bohm et al. |
| 2008/0158778 | A1* | 7/2008 | Lipka et al. ............ 361/502 |
| 2009/0061312 | A1 | 3/2009 | Zhamu et al. |
| 2009/0290287 | A1 | 11/2009 | Lipka et al. |
| 2009/0303660 | A1 | 12/2009 | Nair et al. |
| 2011/0242730 | A1 | 10/2011 | Zhou et al. |
| 2012/0200308 | A1 | 8/2012 | Donne |
| 2012/0249089 | A1 | 10/2012 | Risser et al. |

FOREIGN PATENT DOCUMENTS

| | | |
|---|---|---|
| WO | WO-2005/037467 A2 | 4/2005 |
| WO | WO-2008/112650 | 9/2008 |

OTHER PUBLICATIONS

International Preliminary Report on Patentability, corresponding international application No. PCT/US2011/056007, Apr. 16, 2013.
Anitha et al., Deposition of molybdenum nitride thin films, by r.f. reactive magnetron sputtering, Surface Coatings Technol., 79:50-4 (1996).
*Batteries and Ultra-capacitors for the Smart Power Grid*, 2009. NanoMarkets.
Becker et al., Diffusion barrier properties of tungsten nitride films grown by atomic layer deposition from bis(tert-butylimido)bis(dimethylamido) tungsten and ammonia, Appl. Phys. Lett., 82(14):2239-41 (2003).
Burke, Ultracapacitor technologies and application in hybrid and eectric vehicles, Int. J. Energy Research (2009).
Burke, R&D considerations for the performance and application of electrochemical capacitors, Electrochimica Acta, 53(3):1083-91 (2007).
Chen et al., g-Mo2N/Co3Mo3N composite material for electrochemical supercapacitor electrode, Mater. Chem. Phys., 95(1): 84-8 (2006).
Choi et al., Chemically synthesized nanostructured VN for pseudocapacitor application, Electrochem. Solid-State Lett., 8(8): A418-22 (2005).
Choi et al., Fast and Reversible Surface Redox Reaction in Nanocrystalline Vanadium Nitride Supercapacitors, Adv. Materials, 18(9):1178-82 (2006).
Choi et al., Synthesis, structure, and electrochemical characterization of nanocrystalline tantalum and tungsten nitrides, J. Am. Ceram. Soc., 90(10):3113-20 (2007).
Conway, *Electrochemical Supercapacitors*, New York: Plenum (1999).
Deng et al.,, Characterization of molybdenum nitride as an ultracapacitor material, Proceedings Electrochem. Soc., 96-25 (Electrochemical Capacitors II): 75-84 (1997).
Glushenkov et al., Structure and capacitive properties of porous nanocrystalline VN prepared by temperature-programmed ammonia reduction of V2O5, Chem. Mater., 22(3):914-921 (2010).
Heyden, Nitrierung von aluminium mit gepulsten ionenstrahlen, Dissertation, Heidelberg (2001).
Hu et al., How to achieve maximum utilization of hydrous ruthenium oxide for supercapacitors, J. Electrochem. Soc., 151(2): A281-A290 (2004).
Hu et al., Cyclic voltammetric deposition of hydrous ruthenium oxide for electrochemical capacitors, J. Electrochem. Soc., 146(7):2465-71 (1999).
Hu et al., Design and tailoring of the nanotubular arrayed architecture of hydrous $RuO_2$ for next generation supercapacitors, Nano Lett., 6(12):2690-5 (2006).
Hu et al., Ideal capacitive behavior of hydrous manganese oxide prepared by anodic deposition, Electrochem. Commun., 4(2):105-9 (2002).
Jiang et al., Electrochemical supercapacitor material based on manganese oxide: preparation and characterization, Electrochimica Acta, 47(15): 2381-6 (2002).
Juodkazis et al., On the charge storage mechanism at RuO2/0.5 M H2SO4 interface. J. Solid State Electrochem., 12(11):1399-1404 (2008).
Kinoshita, *Electrochemical Oxygen Technology*, John Wiley & Sons (1992).
Kohmenko et al., Optimisation of an asymmetric manganese oxide/activated carbon capcitor working at 2 V in aqueous medium, J. Power Sources, 153:183-90 (2006).
Kunz et al., Optimierte SiC-barrierenschicht auf keramischen substraten fur kristalline dunnschichtsolarmodule, Ergebnisse aus Forschung und Entwicklung, Zae Bayern, S.38-29 (2002).
Kwon et al., Vanadium nitride catalysts: Synthesis and evaluation for n-butane dehydrogenation, J. Catalysis, 184:236 (1999).
Lee et al., Molybdenum carbide catalysts, J. Catal., 106:125-33 (1987).
Lee et al., Characteristics of plasma enhanced chemical vapor deposited tungsten nitride thin films, Appl. Phys. Lett., 62(25):3312-4 (1993).
Lee et al., Expansion of active site area and improvement of kinetic reversibility in electrochemical pseudocapacitor electrode, Electrochem. Solid-State Lett., 4(3):A19-22 (2001).
Lee et al., Supercapacitor behavior with KCl electrolyte, J. Solid State Chem., 144(1):220-3 (1999).
Li et al., Synthesis and characterization of uniform nanoparticles of g-Mo2N for supercapacitors, Trans. Nonferrous Metal Soc. China, 19(3):620-5 (2009).
Lipatnikov et al., Effects of vacancy ordering on structure and properties of vanadium carbide, J. Alloys Compounds, 261:192-7 (1997).
Liu et al., Behavior of molybdenum nitrides as materials for electrochemical capacitors, J. Electrochem., Soc., 145(6): 1882-8 (1998).
Ma et al., Solid state NMR investigation of hydrous ruthenium oxide, Chem. Phys. Lett., 331(1): 64-70 (2000).
Martinez et al., Electrical, optical and mechanical properties of sputtered CrNy and Cr1-xSixN1.02 thing films, Thin Solid Films, 447-448:332-6 (2004).
Mastragostino et al., Electronically conducting polymers and activated carbon: Electrode materials in supercapacitor technology, Adv. Materials, 8(4):331-4 (1996).
Miller et al., Electrochemical capacitors: challenges and opportunities for real-world applications, Electrochem. Soc. Interface, 17(1):53-7 (2008).
Naoi et al., Electrochemistry of Poly(1,5-diaminoanthraquinone) and Its Application in Electrochemical Capacitor Materials, J. Electrochem. Soc., 147(2): 420-6 (2000).
Olivetti et al., Electrochemical characterization of vanadium oxide nanostructured electrode, J. Electrochem. Soc., 155(7): A488-A493 (2008).
Papaconstantopoulos, Electronic properties of transition-metal nitrides: the group-V and group-VI nitrides VN, NbN, TaN, CrN, MoN, and WN, Phys. Rev. B, 31:752-61 (1984).
*Performance Specification; Batteries, Storage: Automotive, Valve Regulated Lead Acid*, MIL-PRF-32143A(AT), 2010.
Pourbaix, *Atlas of Electrochemical Equilibria in Aqueous Solutions*. 1974, NACE International.
Rudge et al., Conducting polymers as active materials in electrochemical capacitors, J. Power Sources, 47(1-2):89-107 (1994).
Salitra et al., Carbon electrodes for double-layer capacitors. 1. Relations between ion and pore dimensions, J. Electrochem. Soc., 147:2486 (2000).
Sawaguchi et al., Mechanical and electrical properties of silicon nitride-silicon carbide nanocomposite material, J. Am. Ceram. Soc., 74(5):1 142-4 (1991).
Sevilla et al., Performance of templated mesoporous carbons in supercapacitors, Electrochim. Acta, 52:3207 (2007).

(56) References Cited

OTHER PUBLICATIONS

Simon et al., Materials for electrochemical capacitors, Nat. Mater., 7(11):845-54 (2008).

Taylor et al., Nanoimprinted electrodes for micro-fuel cell applications, J. Power Sources, 171:218 (2007).

Toth, *Transition Metal Carbides and Nitrides*, Academic Press, New York (1971).

Toupin et al., Charge storage mechanism of MnO2 electrode used in aqueous electrochemical capacitor, Chem. Mater., 16(16):3184-90 (2004).

Trasatti et al., Ruthenium dioxide: a new interesting electrode material. Solid state structure and electrochemical behavior. J. Electroanal. Chem. Interfacial Electrochem., 29(2):1-2 (1971).

Wang et al., Review: electrical properties of high-temperature oxides, borides, carbides, and nitrides, J. Material Sci., 30:1627-41 (1995).

Wixom et al., High surface area metal carbide and metal nitride electrodes, Material Research Society Symposium Proceedings, 496:643-53 (1998).

*World Ultracapacitor Markets*, Frost and Sullivan, N661-27 (2009).

Yang et al., Electrodeposited nickel hydroxide on nickel foam with ultrahigh capacitance, Chem. Commun. (2008).

Zheng et al., A new charge storage mechanism for electrochemical capacitors, Electrochem. Soc. Lett., 142(1):L6-L8 (1995).

Zheng et al., Hydrous ruthenium oxide as an electrode material for electrochemical capacitors, J. Electrochem. Soc., 142(8): 2699-703 (1995).

Zheng et al., Ruthenium oxide—carbon composite electrodes for electrochemical capacitors, Electrochem. Solid-State Lett., 2(8):359-61 (1999).

Zhou et al., Study on the electrochemical behavior of vanadium nitride as a promising supercapacitor material, J. Phys. Chem. Solids, 70(2):495-500 (2009).

Zumdahl, *Chemistry*, Boston: Houghton Mifflin (1997).

Nonfinal Office Action, U.S. Appl. No. 13/272,016, notification date Aug. 29, 2013.

\* cited by examiner

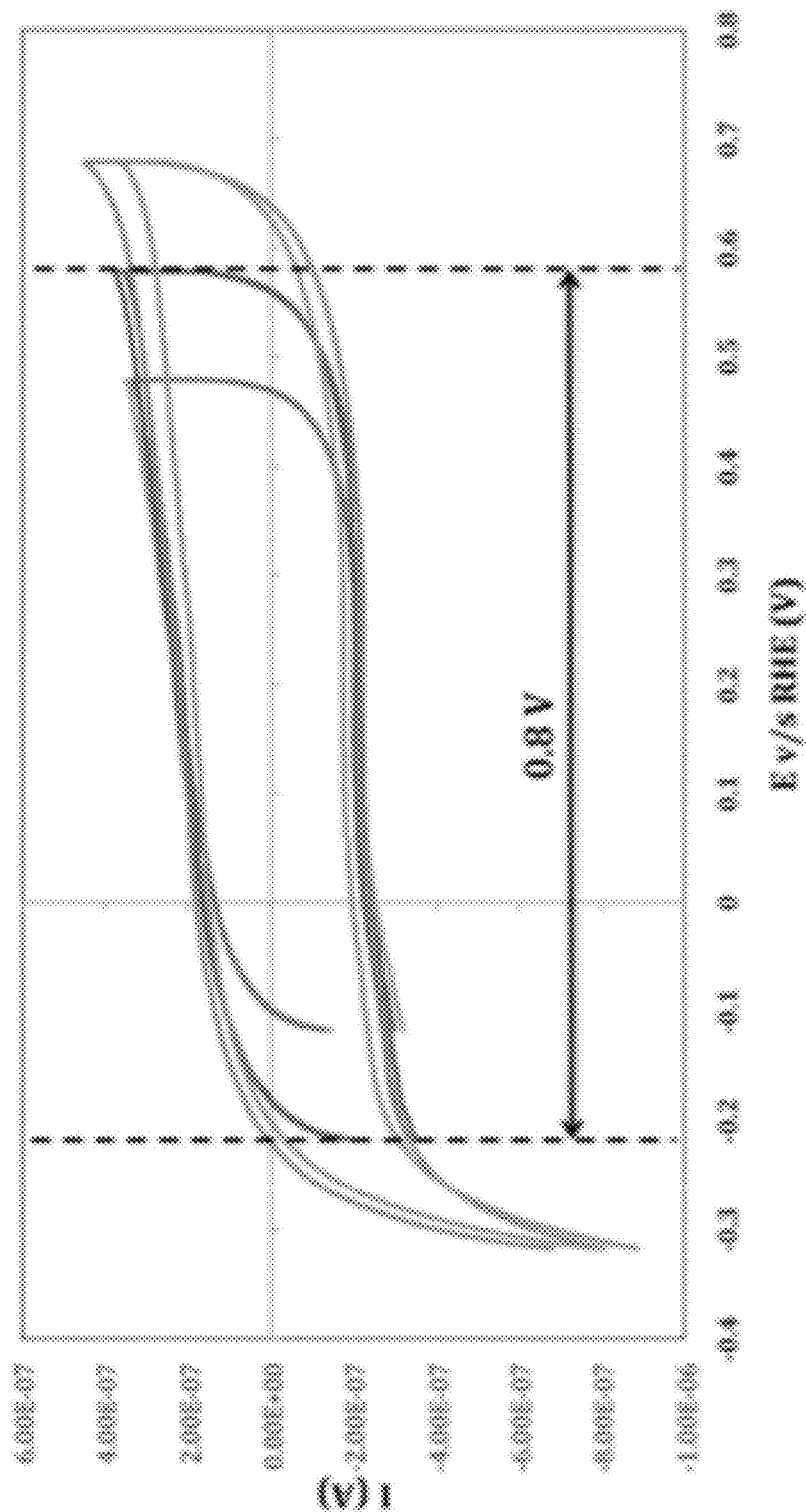

HIGH PERFORMANCE TRANSITION METAL CARBIDE AND NITRIDE AND BORIDE BASED ASYMMETRIC SUPERCAPACITORS

CROSS-REFERENCE TO RELATED APPLICATION

The benefit under 35 U.S.C. §119(e) of U.S. Provisional Patent Application Ser. No. 61/392,311 filed Oct. 12, 2010, is hereby claimed, and its entire disclosure is incorporated herein by reference.

STATEMENT OF GOVERNMENT SUPPORT

This invention was made with government support under grant number W56HZV-04-2-001 awarded by the U.S. Army Tank-Automotive and Armaments Command (TACOM). The government has certain rights in this invention.

BACKGROUND OF THE DISCLOSURE

1. Field of the Disclosure

The disclose relates generally to asymmetric supercapacitors, and more particularly, to transition metal carbide and nitride based asymmetric supercapacitors.

2. Brief Description of Related Technology

Batteries are important energy storage devices used for military and commercial applications. While these devices can have energy densities exceeding 100 Wh/kg, this energy is difficult to fully access in pulsed and high power applications due to the relatively slow kinetics associated with the redox processes of batteries.

Supercapacitors are a class of electrochemical energy-storage devices that could complement batteries for load-leveling or uninterruptible power supply applications. Referring to FIG. 1, in terms of specific energy and specific power, supercapacitors fill the gap between conventional capacitors and batteries. The times shown in FIG. 1 are the time constants of the device, obtained by dividing the energy density by the power. Currently available supercapacitors are well suited to handle pulses of up to a few seconds. To achieve broader application, however, capacitors will have to efficiently manage longer pulses, which translates to higher energy densities.

Supercapacitors have unusually high capacitances compared to traditional capacitors, due to their charge storage mechanisms. In addition to charge storage during formation of an electrical double layer, a portion of the capacitance may be from fast, reversible redox reactions taking place near the electrode surface. Supercapacitors provide higher power than batteries, while storing less energy. Most commercial supercapacitors use very high-surface-area carbon-based active materials. These materials typically yield specific capacitances of up to 200 F/g.

Some materials exploit, fast, reversible faradaic redox reactions that occur with the first few nanometers of the surface of the active material. This pseudocapacitive mechanism has been demonstrated for materials including metal oxides and hydroxides, such as $RuO_2$ and $MnO_2$, and conducting polymers such as polyaniline and polypyrrole. Hydrous $RuO_2 \cdot xH_2O$ is a benchmark pseudocapacitive material and has been shown to yield specific capacitances ranging from 720-1300 F/g, depending on the preparation and heat treatment conditions. Despite the high specific capacitance of the Ruthenia-based materials, their high cost makes them unattractive for large-scale use, and therefore the commercial application of Ruthenia-based supercapacitors has been limited.

Despite their proven performance benefits, supercapacitors have not found widespread commercial use, largely due to the need for higher energy densities and lower cost. For example, the United States Department of Energy has targeted energy and power densities of 15 Wh/kg and 700 W/kg, respectively, for supercapacitors to be used for load-leveling and regenerative braking in hybrid and electric vehicles. State-of-the-art symmetric supercapacitors employing high area carbon electrodes and non-aqueous electrolytes can reach energy densities of 3-5 Wh/kg with power densities of 700 W/kg. These devices have been highly optimized, and only incremental gains in energy density are expected in the future.

A type of asymmetric device architecture has been demonstrated where two different types of electrode materials, for example, a supercapacitor-type electrode and a battery-type electrode are combined. The voltage windows in these devices are wider than those for conventional symmetric supercapacitors. Potential windows as wide as 2 V have been reported for a carbon-$MnO_2$ aqueous system, however, the energy densities were limited due to the moderate capacitances of carbons in aqueous electrolytes.

SUMMARY OF THE DISCLOSURE

In accordance with an embodiment of the disclosure, an asymmetric supercapacitor includes a first electrode comprising a first active material and having a first operating window, wherein the first active material comprises a metal nitride, a metal oxynitride, a metal carbide, a metal oxycarbide, a metal boride, a metal oxyboride, and combinations thereof, and the metal is selected from the group consisting of Groups III, IV, V, VI, or VII of the Periodic Table. The supercapacitor further includes a second electrode comprising a second active material and having a second operating window, wherein first and second operating windows overlap by less than 60%, based on the voltage. The supercapacitor also includes a separator disposed between the first and second electrodes and an aqueous electrolyte.

In accordance with another embodiment, a method of selecting an electrode pairing for use in an asymmetric supercapacitor includes selecting a first active material for a first electrode, the first electrode having a first operating window, wherein the first active material comprises a metal nitride, a metal oxynitride, a metal carbide, a metal oxycarbide, a metal boride, a metal oxyboride, and combinations thereof, and the metal is selected from the group consisting of Groups III, IV, V, VI, or VII of the Periodic Table. The method further includes determining an electrolyte pH in which the first active material is stable. The method also includes selecting a second active material for a second electrode, the second active material being selected such that the second active material is stable at the same electrolyte pH in which the first active material is stable, and the second electrode has a second operating window, which overlaps with the first operating window by less than 60% based on voltage.

BRIEF DESCRIPTION OF THE DRAWING FIGURES

FIG. 1b is a graph illustrating the specific capacity of the macroelectrode of FIG 1a;

FIG. 6 is a cyclic voltammogram of $Mo_2N$ in 0.5M sulfuric acid at a scan rate of 50 mVs$^{-1}$;

Figure 1A:
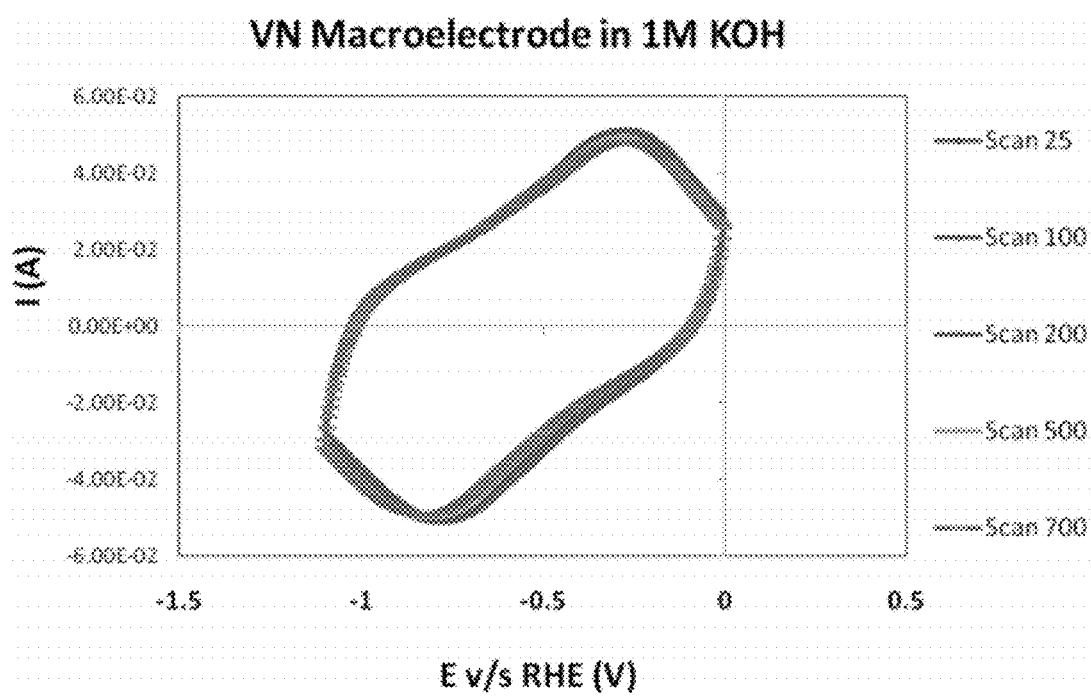
FIG. 1a is a cyclic voltammogram of a vanadium nitride macroelectrode in an aqueous electrolyte.

While the disclosed methods and apparatus are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

The present application describes asymmetric supercapacitors having a transition metal carbide, oxycarbide, nitride, oxynitride, boride, or oxyboride as one of the electrode materials. Asymmetric supercapacitors include different active materials on each electrode. These devices can produce voltage windows that are wider than those for symmetric devices. Since the energy density varies with the square of the voltage, increasing the voltage window in turn enhances the energy performance of the supercapacitor. The supercapacitors of the present disclosure may advantageously include a first electrode active material with a high hydrogen evolution over-potential and a second electrode active material with a high oxygen evolution over-potential. Using a combination of such active materials in a supercapacitor advantageously allows one to operate the supercapacitor using both high oxidation and high reduction potentials, thereby increasing the potential window of the supercapacitor.

Asymmetric supercapacitors in accordance with embodiments of the disclosure generally include a first electrode having a first active material, a second electrode having a second active material, a separator disposed between the first and second electrodes, and an electrolyte.

Conventional supercapacitors generally store charge using only a single charge storage mechanism. Most typically the charge storage mechanism is based on electrical double layer capacitance. In contrast, the asymmetric supercapacitors in accordance with embodiments of the disclosure can advantageously utilize two different storage mechanisms—electrical double layer capacitance and pseudocapacitance. For example, the first active material can be a pseudocapacitive material, while the second electrode can be an electrical double layer capacitive material. The pseudocapacitance mechanism exploits fast, reversible, faradaic redox reactions within the first few nanometers of the surface of the active material.

The first and second electrodes each have an operating window. As used herein the "operating window of an electrode" refers to the maximum voltage range in which the electrode can be stably cycled. A cyclic voltammogram provides the operating window by plotting current as function of voltage. As used herein the "operating window of a supercapacitor," also referred to herein as the "total operating windows" refers to the combined operating window of the electrodes, which spans from the lowest operating voltage of one of the electrodes to the highest operating voltage of one of the electrodes. As used herein an "overlap of operating windows" refers to the voltage range in which both electrodes can be cycled. The percent of overlap is determined by dividing the voltage range of overlap by the total voltage range of the supercapacitor (i.e., the total operating window).

The first and second electrodes can be selected to maximize the total operating window of the supercapacitor, that is to maximum the operating voltage range from negative voltages to positive voltages over which the asymmetric electrode can be cycled. By selection of an appropriate first and second electrode active material pairing, the operating window of the supercapacitor may be extended beyond the performance breakdown regions that would result when using the same active material on each electrode. In one embodiment, the first and second electrodes are selected such that the operating windows of the electrodes do not overlap more than 60% based on the voltage overlap. Other suitable overlaps include less than 58%, 56%, 54%, 52%, 50%, 48%, 46%, 44%, 42%, 40%, 35%, 30%, 25%, 20%, 15%, 10%, or 5%. In one embodiment, the operating windows can have no overlapping voltage operating portions (termed 0% overlap). For example, the electrodes can have operating windows that abut, but not overlap. In another embodiment, the electrodes can have operating windows that are separated by a voltage gap.

The first electrode can have an active material with a high hydrogen evolution over-potential. For example, the active material can have a hydrogen evolution over-potential of 0.6 V or greater. The active material is a nitride, an oxynitride, a carbide, an oxycarbide, a boride, or an oxyboride of a metal of Groups III, IV, V, VI, and VII of the Periodic Table. Suitable metals include, for example, chromium, molybdenum, tungsten, vanadium, niobium, tantalum, titanium, and zirconium. For example, the active material can be vanadium nitride, vanadium carbide, molybdenum carbide, molybdenum nitride, tungsten carbide, and tungsten nitride. The active material preferably has a high specific surface area of about 40 m$^2$/g or greater. For example, VN having a specific surface area of about 40 m$^2$/g has been measured to have a capacity of about 140 F/g.

These materials have electrical conductivities that can be higher than those for transition-metal oxides, and can be produced with specific surface areas exceeding 100 m²/g. Table 1 provides conductivities of some active materials, showing that the transition metal nitrides, oxynitrides, carbides, oxycarbides, borides, and oxyborides used as the first active material have significantly higher conductivities as compared to carbons and transition metal oxides.

TABLE 1

Conductivities

| Material | Conductivity $(\mu\Omega \cdot cm)^{-1}$ |
|---|---|
| $RuO_2$ | 0.0002 |
| $MnO_2$ | 0.0005 |
| VN | 0.012 |
| VC | 0.017 |
| Carbon | 0.001 |

For example, VN having a specific surface area of about 100 m²/g can have a capacity of about 300 F/g. Without intending to be bound by theory, it is anticipated that the capacity increases linearly with the available surface area that is accessible by the key charge storage species. High specific surface area active materials can be formed, for example, as described in U.S. Pat. No. 5,680,292, the disclosure of which is incorporated herein in its entirety. These materials generally possess good chemical stabilities and are typically inexpensive to produce. Any other preparation methods can also be used to form the high surface area active materials.

High surface area transition metal nitrides, oxynitrides, carbides, oxycarbides, borides, and oxyborides can be formed, for example, using a precursor that is an oxide or chloride of the transition metal. The precursor can be converted to a nitride, carbide, or boride by reacting the precursor with a reductant as the temperature is increased. Suitable reductants include, for example, ammonia, hydrazine, nitrogen, methyl amine, methane, ethane, and diborane. Hydrogen and/or an inert gas can be added to the reaction to assist the conversion of the precursor material to a nitride or carbide or boride. For example, the precursor can be placed in an anaerobic chamber and subjected to a programmed increase in temperature while ammonia gas, hydrogen gas, or nitrogen gas, for example, as passed over the precursor material. The rate of increase in temperature may be linear (0° K./hr to 500° K./hr), for example, or nonlinear, but should be uniform without sudden changes in rate. The reaction can be rapidly quenched after completion or held at the final reaction temperature (500° K. to 1300° K.) for a period of time and then quenched to room temperature. Optionally, the resulting nitride or carbide can be passivated by a stream of 1% oxygen in helium, during cooling.

In one embodiment, a high surface area nitride can be used as a precursor material to form a high surface area carbide active material. The nitride can be chemically converted to a carbide by reacting it with a suitable reactant. Suitable reactants include, for example, methyl amine, methane, and ethane. The reaction may be carried out isothermally or in a temperature programmed manner. After completion, the reaction should be rapidly quenched or held at the final reaction temperature for a period of time then quenched to room temperature. Hydrogen and/or inert gas may be added to assist the conversion.

In one embodiment, the precursor is coated onto an electrode substrate prior to converting the precursor to the nitride, carbide, or boride. The precursor can be dissolved in a solvent, for example, for deposition onto the electrode substrate.

In another embodiment, the formed nitride or carbide powder is dispersed in a slurry and then applied to the substrate and then dried. The nitride or carbide powder can be dispersed into the slurry, for example, by stirring the nitride or carbide powder into a solvent such as, for example, N-methylpyrrolidinone (NMP) along with a polymeric binder, such as for example, polyvinylidenefluoride (PVDF) and graphite. The binder and graphite are typically minor components and can be included, for example, as about 10% of the total weight of the slurry. In either embodiment, the precursor or nitride or carbide active material can be deposited onto the electrodes substrate, for example, by dip coating, spray deposition, physical vapor deposition, or plasma arc spraying.

Figure 12:
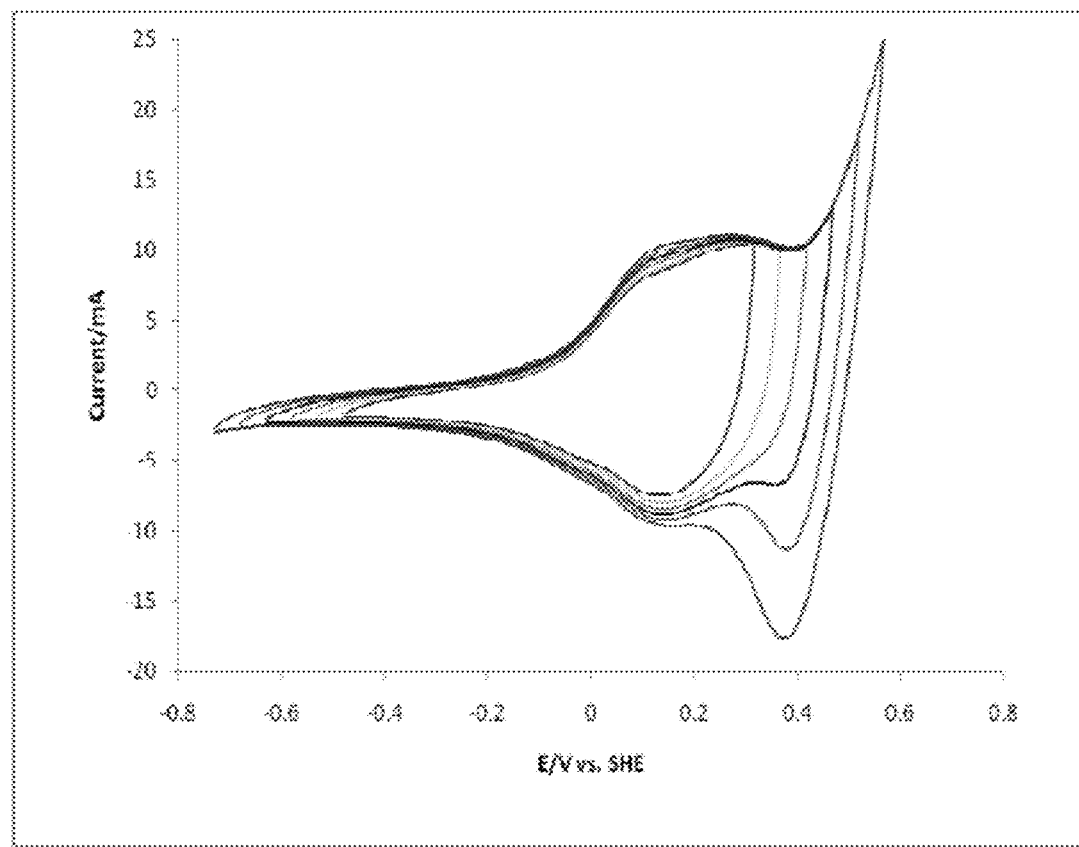
FIG. 12 is a cyclic voltammogram of cobalt oxide in 1M KOH electrolyte at a scan rate of 50 mVs$^{-1}$.
Figure 13:
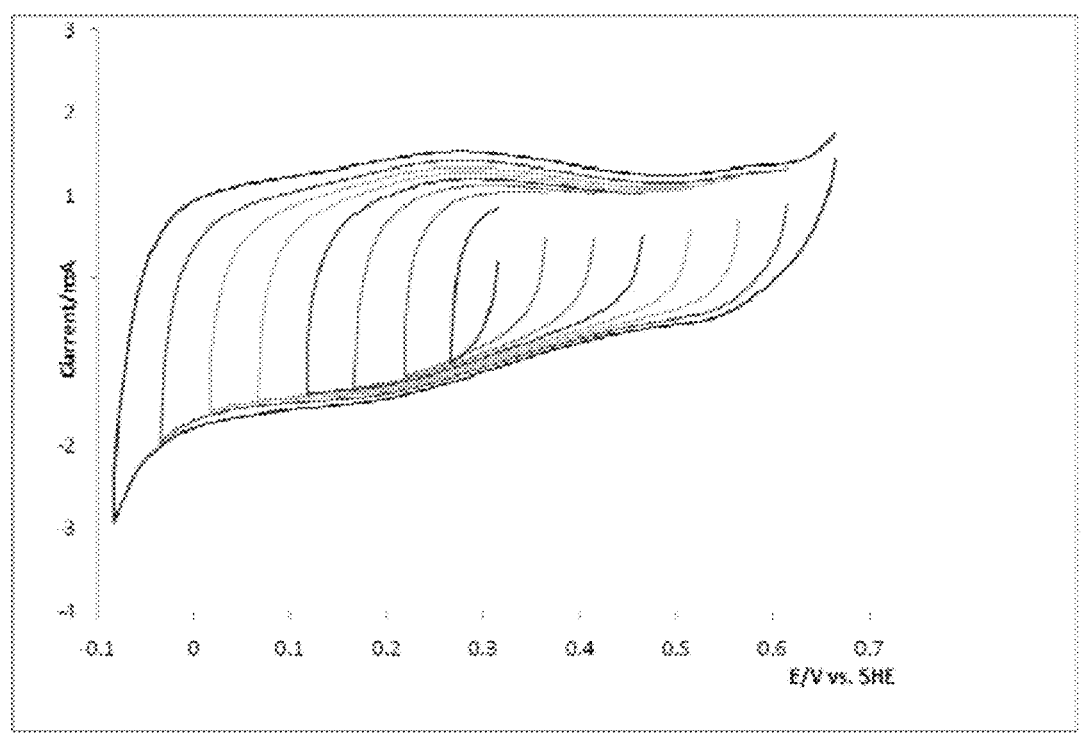
FIG. 13 is a cyclic voltammogram of manganese oxide in 1M KOH electrolyte at a scan rate of 50 mVs$^{-1}$.
Figure 14:
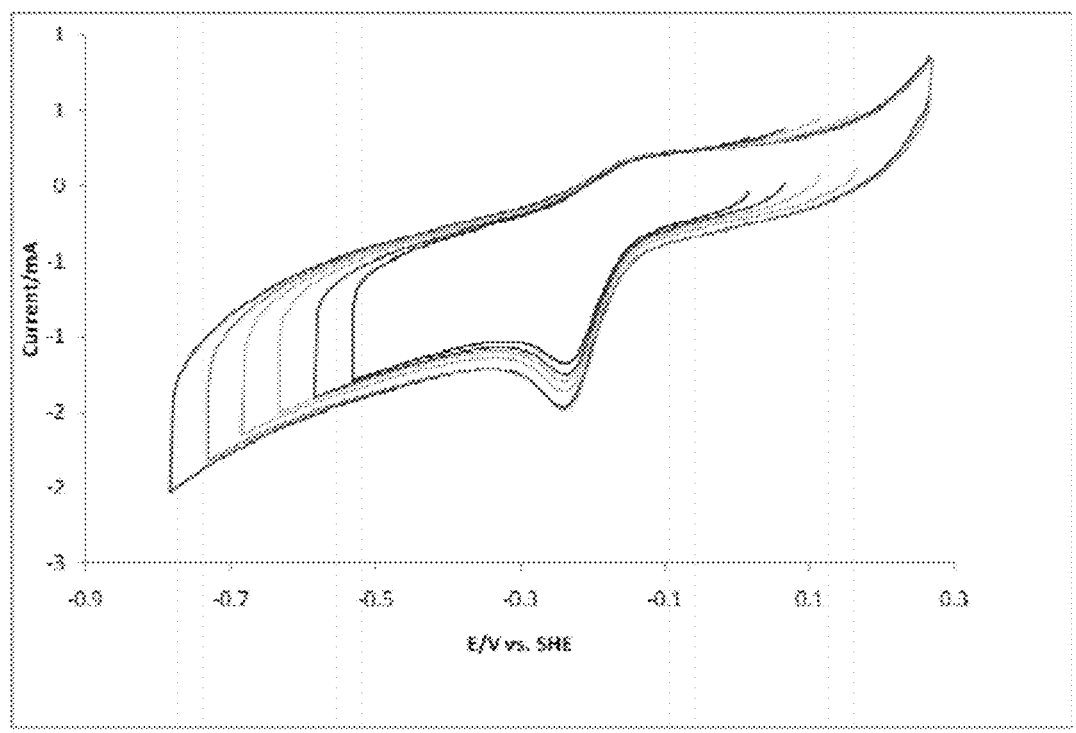
FIG. 14 is a cyclic voltammogram of nickel oxyhydroxide in 1M KOH electrolyte at a scan rate of 50 mVs$^{-1}$.

The second electrode can have an active material (also referred to herein as the "second active materials") with a high over-potential for oxygen evolution. For example, the over-potential for oxygen evolution can be 0.6 V or greater. For a number of oxides the over-potential for oxygen evolution is a function of the enthalpy of oxygen absorption. For example, the second active material can be a metal oxide, such as, manganese oxide, ruthenium oxide, iridium oxide, cobalt oxide, and nickel oxyhydroxide. Cyclic voltammograms illustrating the operating windows of cobalt oxide, manganese oxide, and nickel oxyhydroxide are shown in FIGS. 12-14, respectively. As shown in FIG. 12, cobalt oxide has an operating window of about −0.8 V to about 0.5 V. As shown in FIG. 13, managese oxide has an operating window of about −0.05 V to about 0.65 V. As shown in FIG. 14, NiOOH has an operating window of about −0.8 V to about 0.3 V. Bimetallic oxides containing Pb and Fe may also be used as the second active material. The second electrode active material should be chosen so as to complement the redox behavior of the first electrode active material. For example, a Pourbaix diagram can be used to determine suitable second electrode active materials.

As described above the second active material should be selected such that the overlap in operating windows of the first and second electrodes is not greater than 60% based on voltage. Suitable combinations of first and second electrodes include for example, a vanadium nitride first electrode and a manganese oxide second electrode; a vanadium nitride first electrode and a cobalt oxide second electrode, a vanadium nitride first electrode and a nickel oxyhydroxide second electrode, and a molybdenum nitride first electrode and a ruthenium oxide second electrode.

The operating window of a supercapacitor in accordance with embodiments of the disclosure can be greater than 1.4 V. For example, the operating window can be up to about 2.2 V. Supercapacitors in accordance with disclosure can have operating windows, for example, of about 1.5, 1.6, 1.7, 1.8, 1.9, 2, 2.1, and 2.2 V.

Additionally, such increased potential windows can be achieved in an aqueous electrolyte. The use of aqueous electrolytes beneficially has lower cost, lower toxicity, and lower flammability as compared to non-aqueous electrolytes. For example, the aqueous electrolyte can be potassium hydroxide, sodium hydroxide, ammonium hydroxide, lithium hydroxide, aqueous sulfuric acid, aqueous nitric acid, and aqueous phosphoric acid. The aqueous electrolyte can have a molarity of about 1M up to about 10M. Other suitable molarities include about 1, 2, 3, 4, 5, 6, 7, 8, 9, and 10M. Increased molarity advantageously has a lower freezing point, for example, below about −40° C., and can result in higher charge transfer rates as a result of the high anion concentration. Use of NaOH as the aqueous electrolyte can advantageously decrease the overall cost of the asymmetric supercapacitor.

The electrolyte of supercapacitors in accordance with the disclosure can either be acidic or basic. For example, a basic electrolyte can have a pH of 10 or greater. For example, an acidic electrolyte can have a pH of 4 or less. Other pHs may be suitable depending on the active materials used in the supercapacitor. The electrolyte can be selected such that the first and second active materials are stable in the environment (acidic or basic). For example, active materials such as vanadium nitride, vanadium carbide, and tungsten nitride are generally stable in acidic electrolytes. Active materials such as molybdenum nitride and tungsten carbide are generally stable in basic electrolytes.

Suitable electrode substrates upon which the first active material and/or second active materials can be coated to form the first and second electrodes include conductive materials such as glassy carbon, titanium, zirconium, tantalum, molybdenum, tungsten, and ruthenium oxide. Other suitable substrate materials include material selected from Groups IV, V, VI, VII, and VIII of the Periodic Table.

In accordance with an embodiment of the disclosure, a method of selecting a first and second electrode pairing for a supercapacitor can include selecting a first active material for the first electrode. As described above, the first electrode has a first operating window and the first active material comprises a metal nitride, a metal oxynitride, a metal carbide, a metal oxycarbide, a metal boride, a metal oxyboride, and combinations thereof, and the metal is selected from the group consisting of Groups III, IV, V, VI, or VII of the Periodic Table. The method further includes determining an electrolyte pH in which the first active material is stable. A second active material for a second electrode is then selected. The second active material is selected such that the second active material is stable at the same electrolyte pH in which the first active material is stable. Selection of the second active material further requires selecting an electrode having a second operating window, which overlaps with the first operating window by less than 60% based on voltage. Other overlaps as described above can also be used as the selection criteria. Additionally, any of the above-described active materials and electrolytes can be considered for use in the method.

EXAMPLES

Example 1

An asymmetric supercapacitor having vanadium nitride as the reduction resistant electrode active material and manganese oxide as the oxidation resistant electrode active material was formed. The manganese oxide electrode was formed as is known in the art. The vanadium nitride active material was formed by placing an oxide or chloride of vanadium in an anaerobic chamber and subjecting it to a programmed increase in temperature while ammonia gas or hydrogen and nitrogen gases were passed over it. The material was then passivated by a stream of 1% oxygen in helium, during cooling. The resulting vanadium nitride had a surface area of about 10 $m^2/g$. High surface area vanadium nitride powders can be produced. The vanadium nitride was dispersed into a slurry by stirring it into a liquid such as N-methylpyrrolidinone (NMP) along with a polymeric binder such as polyvinylidenefluoride (PVDF) and graphite. The binder and graphite were minor components, comprising, for example, about 10% by weight of the total weight of the slurry. The slurry was coated onto a conducting electrode substrate such as glassy carbon and oven dried.

Figure 1B:
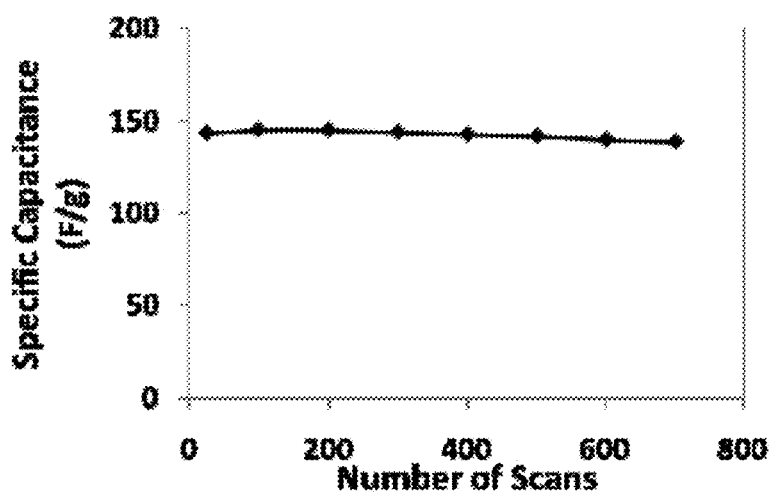

As shown in FIGS. 1a and 1b, the vanadium nitride electrode had electrochemical properties suitable for use in supercapacitors, including, for example, high capacitance as well as high stability. FIG. 1a shows the high stability of a vanadium nitride electrode, illustrating multiple overlapping scans without significant variation, which corresponds to stable charging and discharging of the capacitor.

Figure 2:
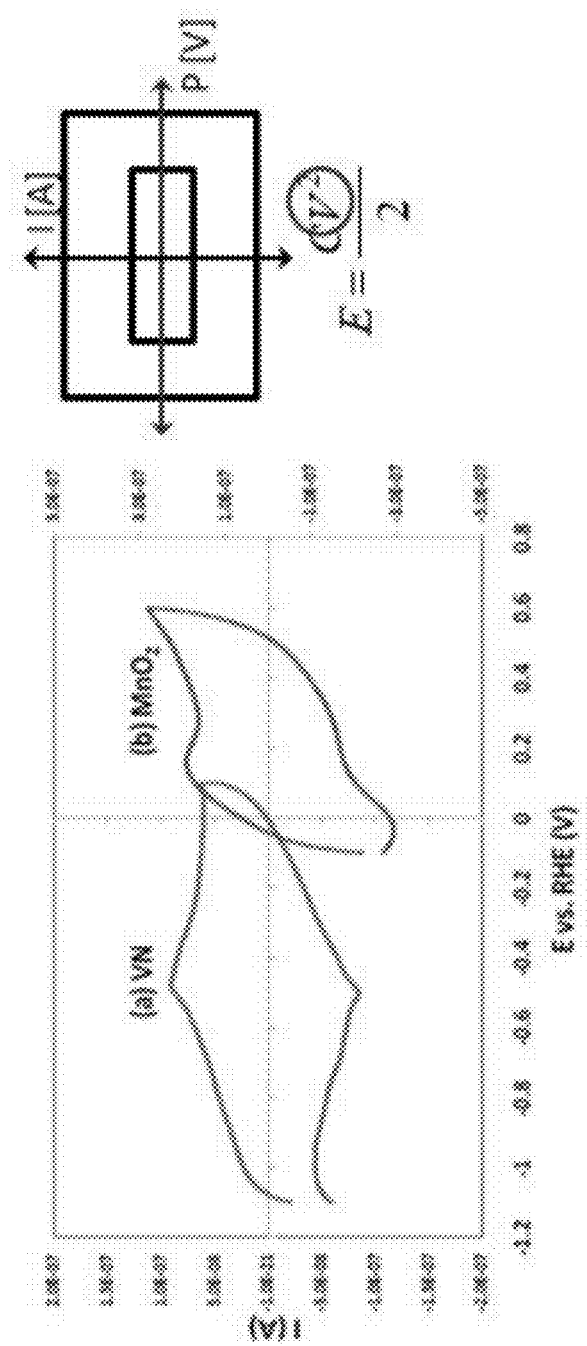
FIG. 2 is a cyclic voltammogram of (a) vanadium nitride, and (b) manganese oxide in 1M KOH electrolyte using a scan rate of 50 mV/s at room temperature. Each voltammogram was superimposed at 25 and 100 cycles, and overlaid to demonstrate the stability and widened potential window of about 1.8V.

By combining the vanadium nitride electrode with a manganese oxide electrode, the voltage window, and correspondingly the capacitance, of the supercapacitor can be expanded. As illustrated in FIG. 2, the combined use of the two electrodes allows for a widened potential window of about 1.8V when used in an aqueous electrolyte. Specifically, a 1M KOH electrolyte was used to test the potential window. Advantageously, the potential window was expanded beyond the typical maximum voltage of 1V for aqueous electrolytes.

Figure 3:
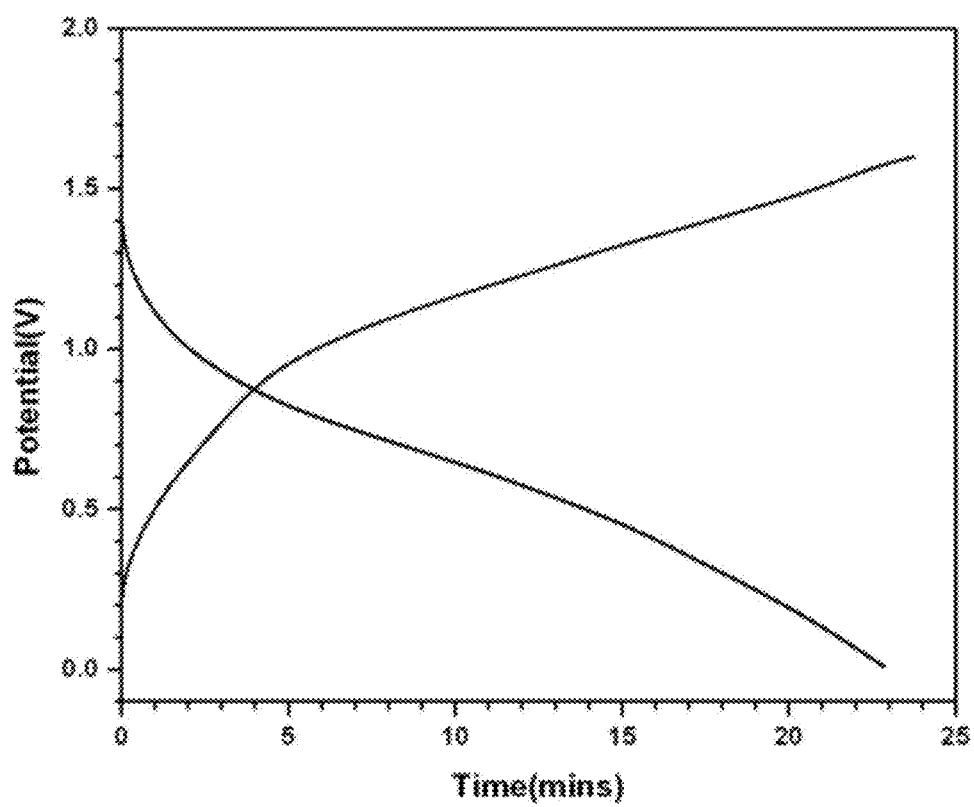
FIG. 3 is a graph illustrating the constant current (0.2 mA) charge and discharge curves for a vanadium nitride-manganese oxide button cell in 1M KOH electrolyte.

The vanadium nitride and manganese oxide electrodes were incorporated into a CR2032 button cell. Referring to FIG. 3, the button cell yielded an energy density of 4.4 Wh/kg at 1.6 V. The potential window was wider than the thermodynamic limit for an aqueous system. Without intending to be bound by theory, it is believed that the increased potential window is the result of the high hydrogen over-potential exhibited by the vanadium nitride under negative polarization and the high oxygen evolution over-potential exhibited by the manganese oxide. The cell could be cycled for more than 1000 times.

The extent of widening of the potential window for an asymmetric capacitor may be determined by selection of the active material pairings. In some examples, the pairing may be constrained by having a desired overlap in potential windows of each individual active material. The overlap provides for efficient transfer between reduction and oxidation states without entering a region of performance (or active material) breakdown. The extent of such overlap may be adjusted based on active material type and, where desired, to maximize the width of the resulting asymmetrical pairing potential window.

Example 2

The electrode materials tested were VN, VC, $Mo_2C$, $Mo_2N$, $W_2C$ and $W_2N$ and the electrolytes were aqueous solutions of KOH and $H_2SO_4$. Cyclic voltammetry was used to identify stable electrode and electrolyte systems and also to determine the stable operating voltage window. The cyclic voltammetry experiments were performed using a microelectrode as the working electrode. The transition-metal carbides and nitrides were loaded onto the tip of a gold microelectrode by abrasive adhesion.

Figure 4:
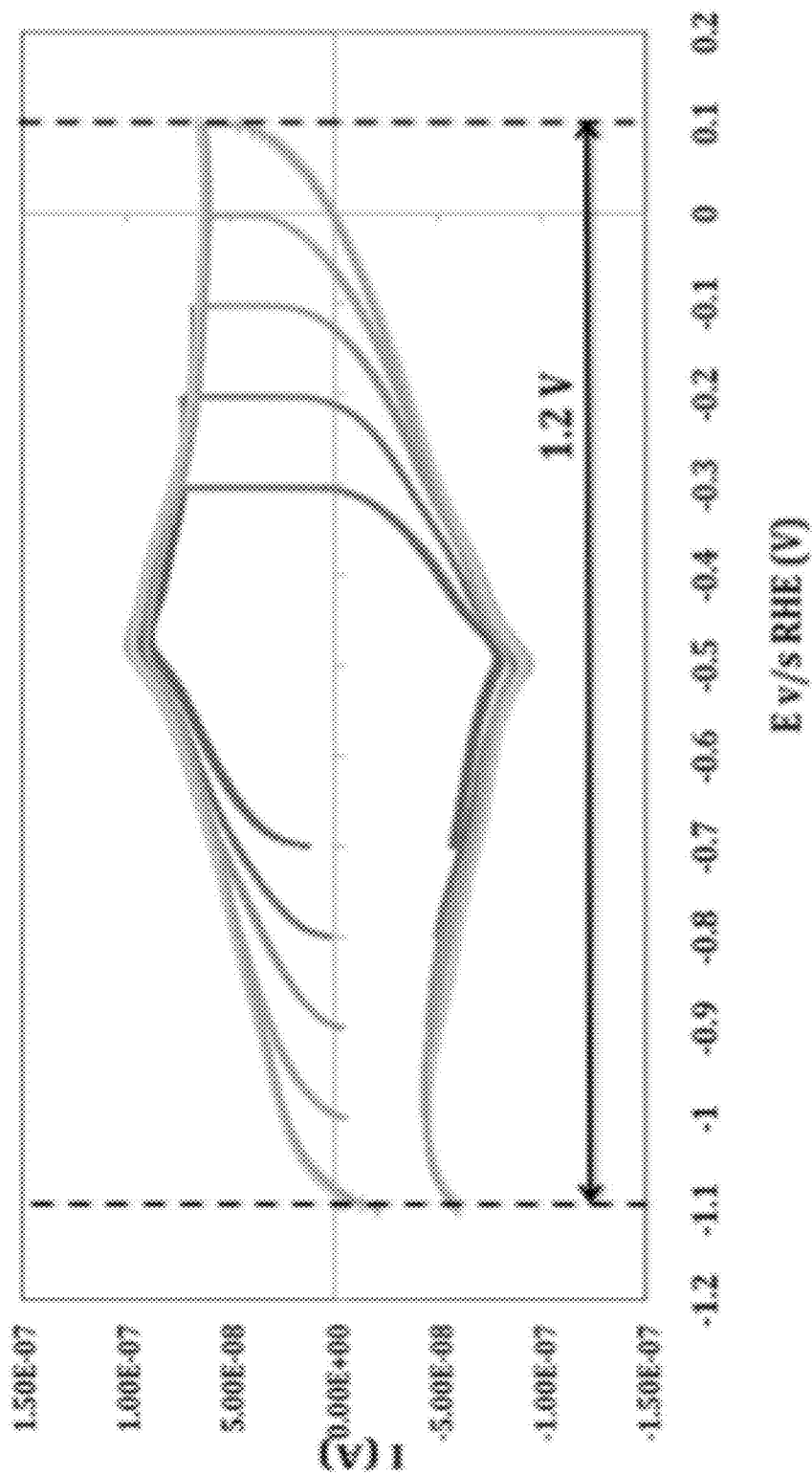
FIG. 4 is a cyclic voltammogram of VN in 0.1M KOH at a scan rate of 50 mVs$^{-1}$.
Figure 5:
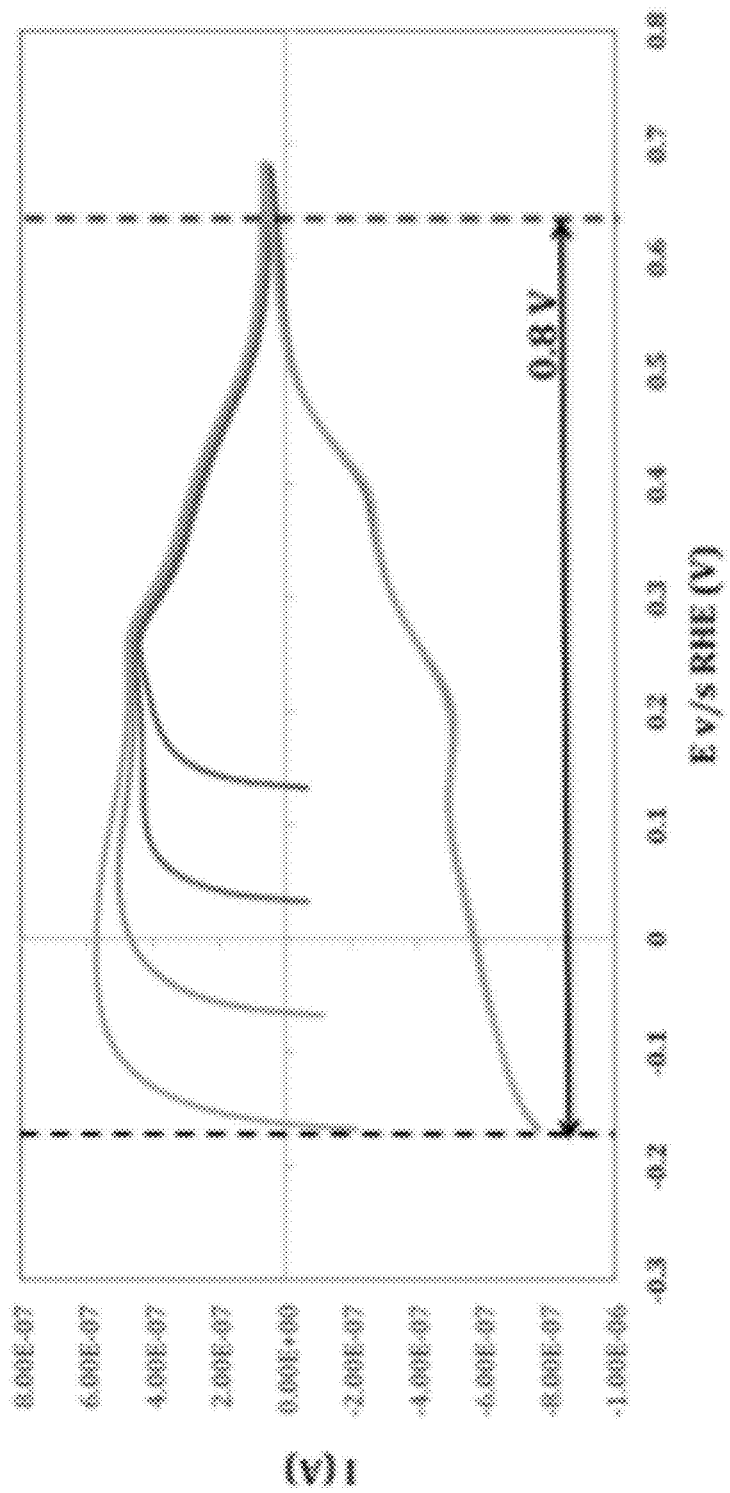
FIG. 5 is a cyclic voltammogram of $W_2C$ in 0.5M sulfuric acid at a scan rate of 50 mVs$^{-1}$.

A three-electrode system was used to perform cyclic voltammetry with a Pt flag as the counter electrode (CE). The reference electrode (RE) was Hg/HgO in KOH and $Hg/HgSO_4$ in $H_2SO_4$. FIGS. 4-6 show cyclic voltammograms (overlay of the $25^{th}$ and $100^{th}$ scan within a potential range) for VN, $W_2C$ and $Mo_2N$ at a scan rate of 50 mV/s. One hundred scans were carried out within a potential range and then the range was expanded in order to determine the widest stable potential range. Table 2 summaries the results of the screening experiments and their measured capacitance. The capacitance in Table 1 was measured at a scan rate of 2 $mVs^{-1}$.

TABLE 2

Results for Electrochemical Characterization by Cyclic Voltammetry

| Stability Window (V) | Material | Capacitance (F/g) |
|---|---|---|
| 1.1 (KOH) | VN | 210 |
| 0.8 (KOH) | VC | 2.6 |
| 0.8 ($H_2SO_4$) | $Mo_2N$ | 346 |
| 0.7 ($H_2SO_4$) | $W_2C$ | 79 |
| 0.8 (KOH) | $W_2N$ | 25 |

Table 3 summarizes the stability results of the screening experiments.

TABLE 3

Stability Results

| | Stability Window (V) | |
|---|---|---|
| Material | KOH Electrolyte | $H_2SO_4$ Electrolyte |
| VN | 1.2 | Unstable |
| VC | 0.7 | Unstable |
| $Mo_2N$ | Unstable | 0.8 |
| $Mo_2C$ | Unstable | Unstable |
| $W_2N$ | 0.7 | Unstable |
| $W_2C$ | Unstable | 0.8 |

In order to determine the electrolyte species contributing to the pseudocapacitive behavior in VN, preliminary experiments were carried out on the VN—KOH system. The electrolyte ions $K^+$ and $OH^-$ were isolated and paired with redox inactive counter ions as shown in Table 4.

TABLE 4

Isolation of KOH Ions by Forming Pairs with Inactive Counter Ions

| | Anion | |
|---|---|---|
| Cation | $OH^-$ (Hydroxyl) | $(CF_3SO_3)^-$ (Triflate) |
| $K^+$ (Potassium) | $K^+OH^-$ (Potassium Hydroxide) | $K^+(CF_3SO_3)^-$ (Potassium Triflate) |
| $(C_2H_5)_4N^+$ (TEA) | $(C_2H_5)_4N^+ OH^-$ (Tetraethylammonium Hydroxide, TEA-OH) | $(C_2H_5)_4N^+(CF_3SO_3)^-$ (Tetraethylammonium Triflate, TEA-Triflate) |

The counter ions, tetraethylammonium (TEA)⁻ and triflate⁺, were chosen as they are known to be redox inactive. Cyclic voltammetry for VN in each of these four electrolytes in aqueous 0.1M solutions, were conducted. VN was scanned at a scan rate of 50 mVs⁻¹. These results showed that the redox behavior of VN in TEA-OH and K—OH were similar. The peaks seen in the case of K-triflate do not coincide with those observed for VN in K—OH. The hydroxyl appears to be the active species, not the solvent or other ions in the solvent.

Figure 7A:
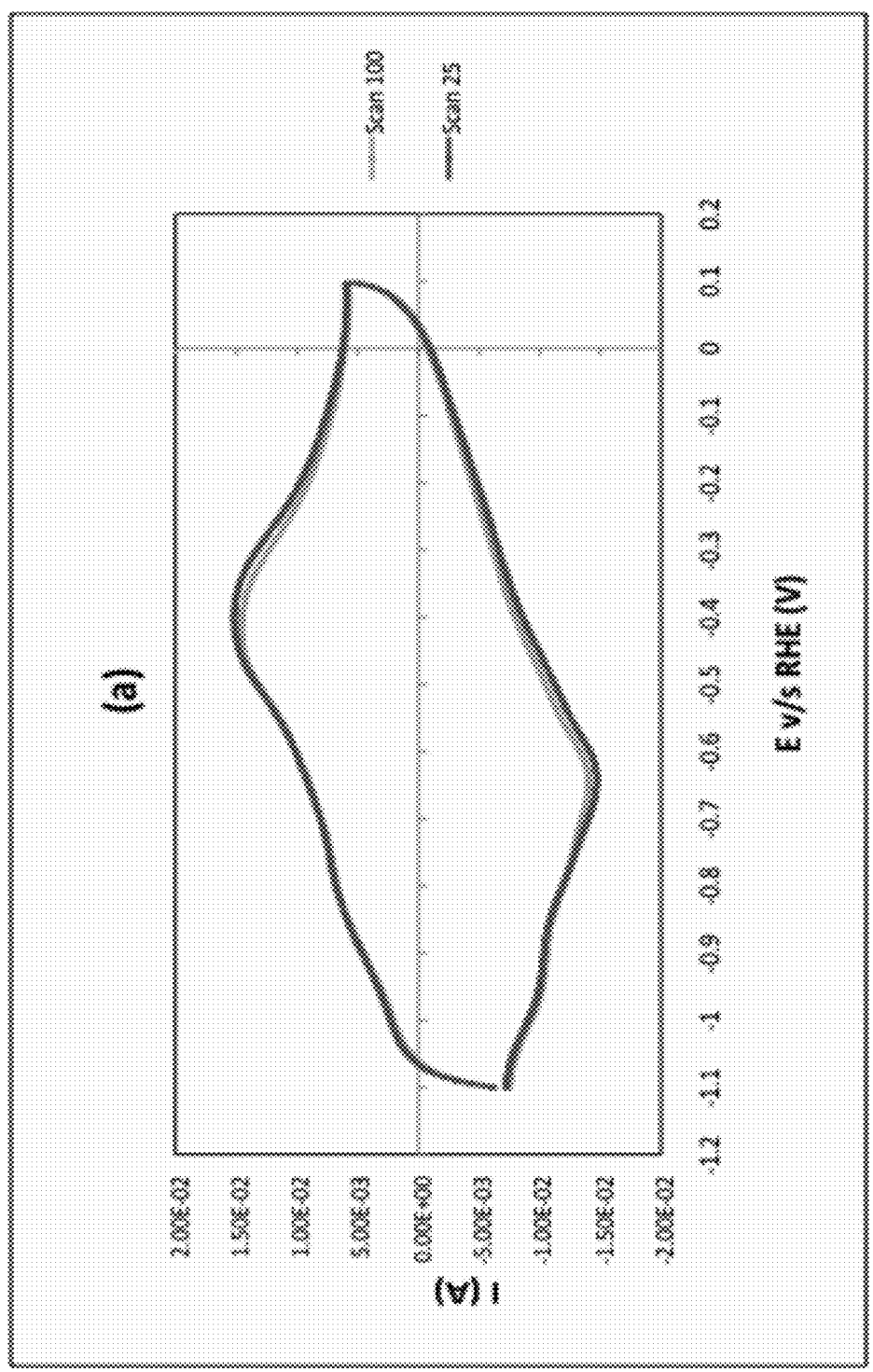
FIG. 7a is a cyclic voltammogram of VN in 1M KOH at a scan rate of 50 mVs$^{-1}$.
Figure 7B:
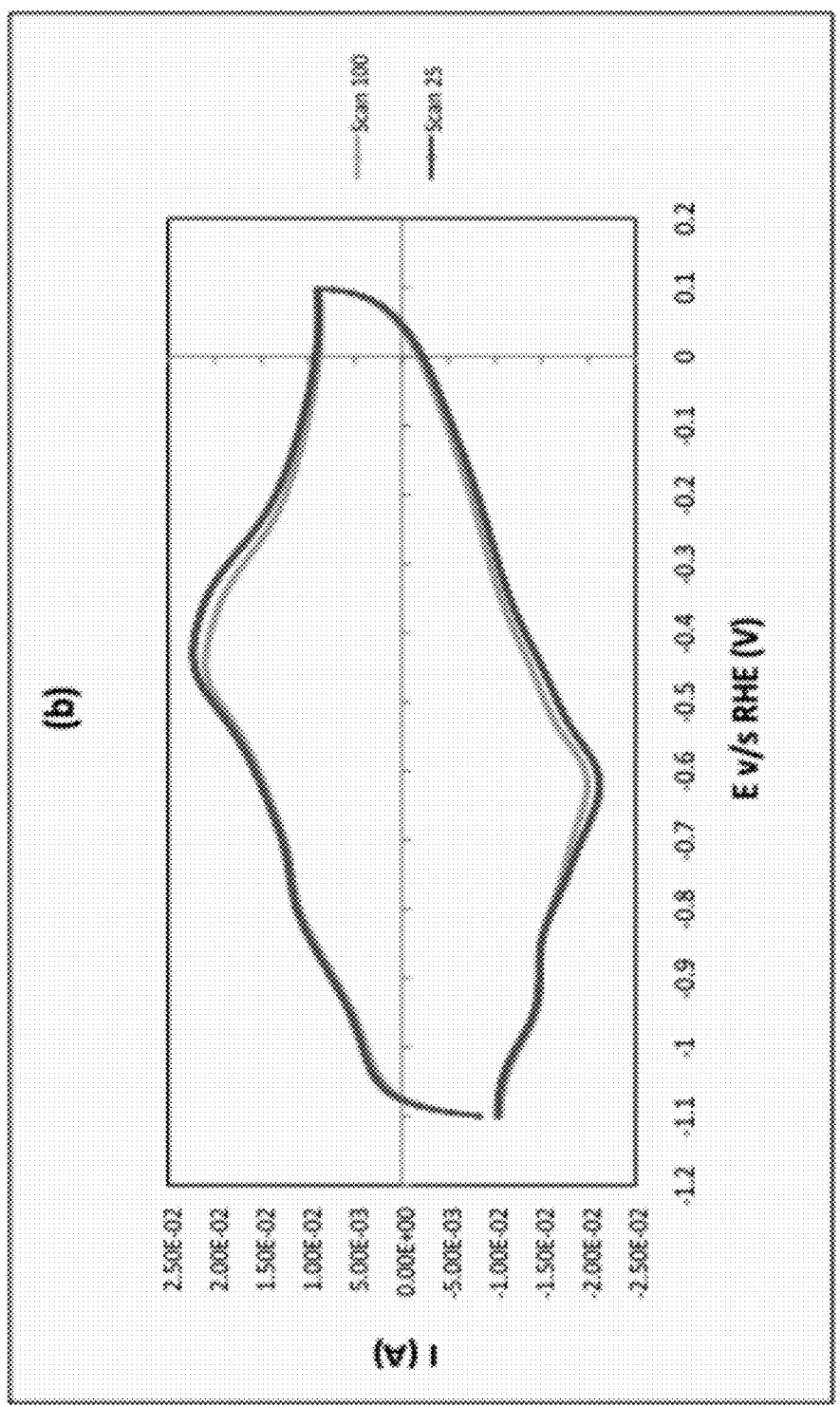
FIG. 7b is a cyclic voltammogram of VN in 1M KOH at a scan rate of 50 mVs$^{-1}$.

Given these findings and with a view towards reducing the supercapacitor cost, NaOH may be used as an alternative to KOH. The use of NaOH could reduce costs associated with the electrolyte by about 50%. FIGS. 7a and 7b illustrate voltammograms for VN in 1M KOH and 1M NaOH, respectively. The results were nearly identical, suggesting that the electrochemistry and amount of energy stored for these systems is comparable.

Example 3

Figure 8:
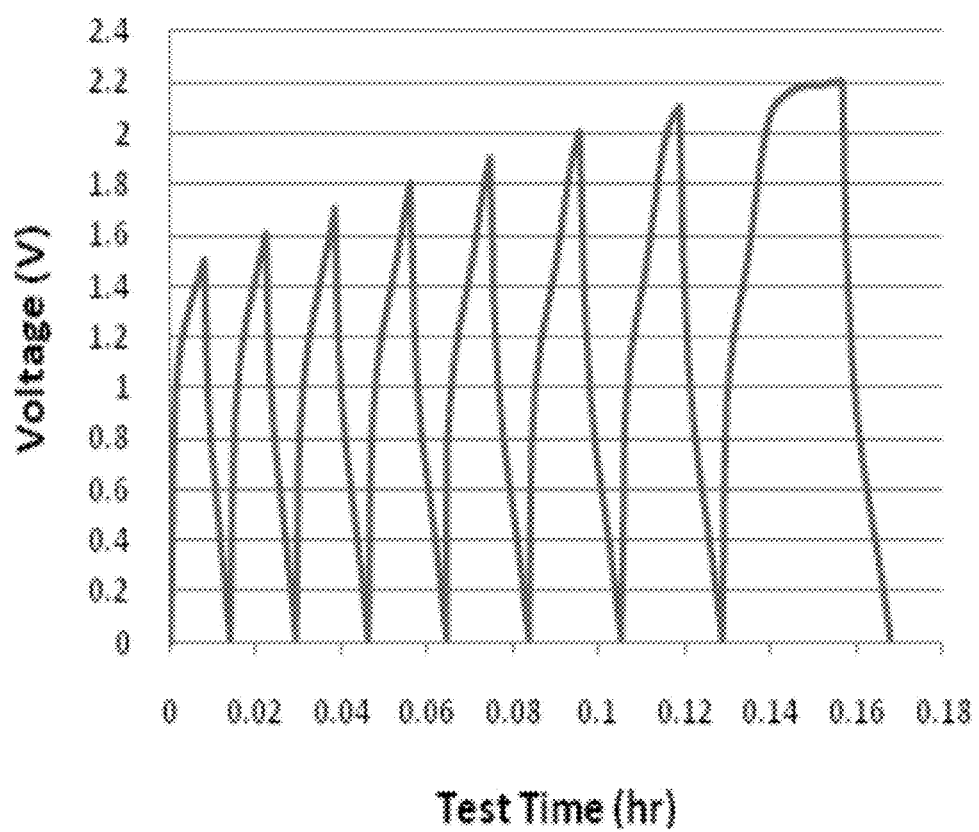
FIG. 8 is a voltage curve of a VN—$MnO_2$ asymmetric button cell in accordance with an embodiment of the disclosure.

A VN-$MnO_2$ supercapacitor was tested to determine the operating window. Referring to FIG. 8, the supercapacitor was demonstrated to have an operating window in excess of 2V (about 2.2V). The supercapacitor included VN and $MnO_2$ electrodes in 1 M KOH electrolyte. The VN had a modest surface area of about 40 m²/g and a capacity of 140 F/g. The supercapacitor was assembled using a CR2032 button cell. The cell yielded energy densities up to about 8.6 Wh/kg (based on the active material) at 2V. The potential window was wider than the thermodynamic limit for an aqueous system because of the high hydrogen evolution over-potential exhibit by VN under negative polarization and the high oxygen evolution potential for $MnO_2$ as the positive electrode.

Figure 9A:
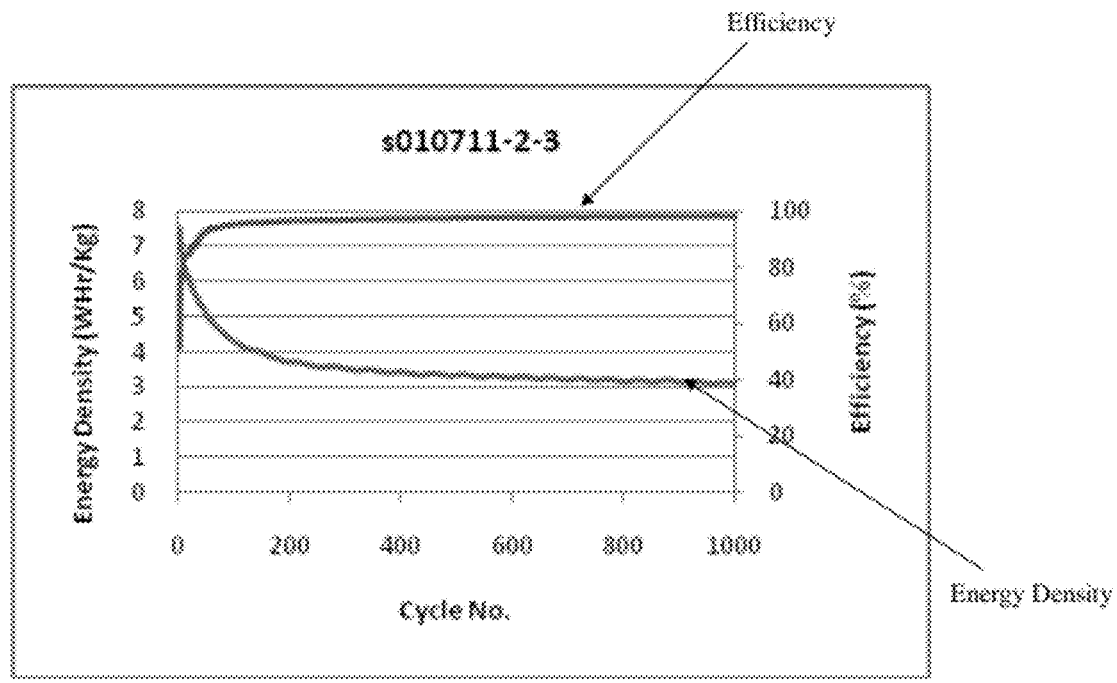
FIG. 9a is a cycling data graph for a VN—$MnO_2$ asymmetric button cell in accordance with an embodiment of the disclosure.
Figure 9B:
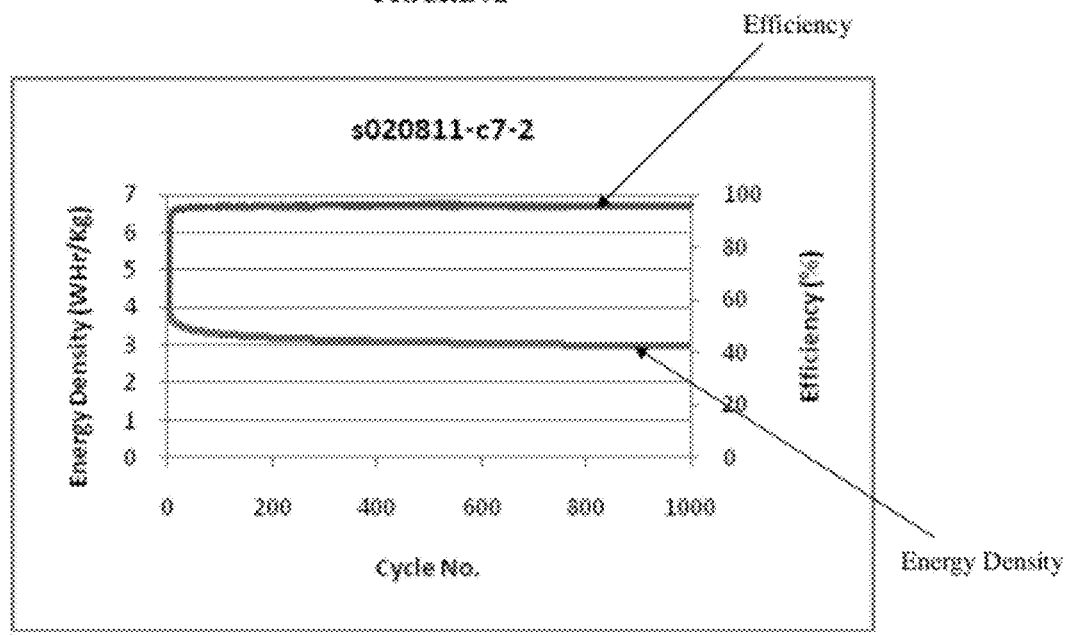
FIG. 9b is a cycling data graph for a conventional carbon based symmetric button cell.

Referring to FIG. 9a, cells were cycled from full charge to full discharge with a current of 1 A/g active material for more than 1000 cycles and demonstrated high energy densities which were comparable to highly optimized carbon systems (FIG. 9b). Cycling in FIG. 9a was performed at a constant current of 10 mA (0.01-2V). The carbon cell of FIG. 9b was a carbon based symmetric button cell in 1.5 M tetraethylammonium tetrafloroborate (TEA-$BF_4$) in acetonitrile as the electrolyte. Cycling in FIG. 9b was performed at a constant current of 5 mA (0.01-2.7V) at room temperature. This data suggests that further optimization of VN-$MnO_2$ systems, such as by improving the specific surface area of the active material, will results in supercapacitors which exceed the performance (energy density) of current, highly optimized carbon systems. In contrast to the carbon system, the VN-$MnO_2$ can achieve these high energy densities while advantageously using an aqueous electrolyte.

Figure 10:
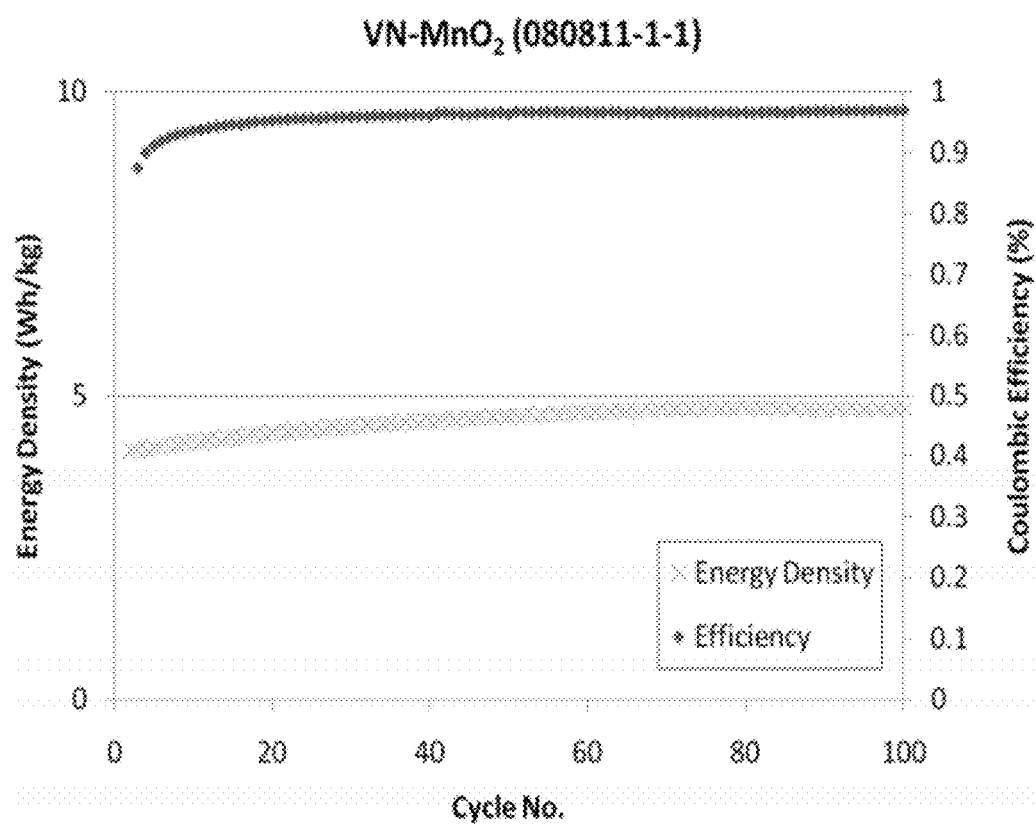
FIG. 10 is a cycling data graph for a VN—$MnO_2$ asymmetric button cell in accordance with an embodiment of the disclosure.

FIG. 10 similarly illustrates the cycling of a VN-$MnO_2$ cell. The cell included a first electrode having 2.9 mg of VN (having a specific surface area of 1.5 mg/cm²) as the first active material and a second electrode having 6.5 mg of $MnO_2$ (having a specific surface area of 3.3 mg/cm²) as the second active material. The mass ratio $MnO_2$/VN was 2.24. The cell was cycled from 0.1 V to 1.7 V at a constant current of 5 mA.

Figure 11:
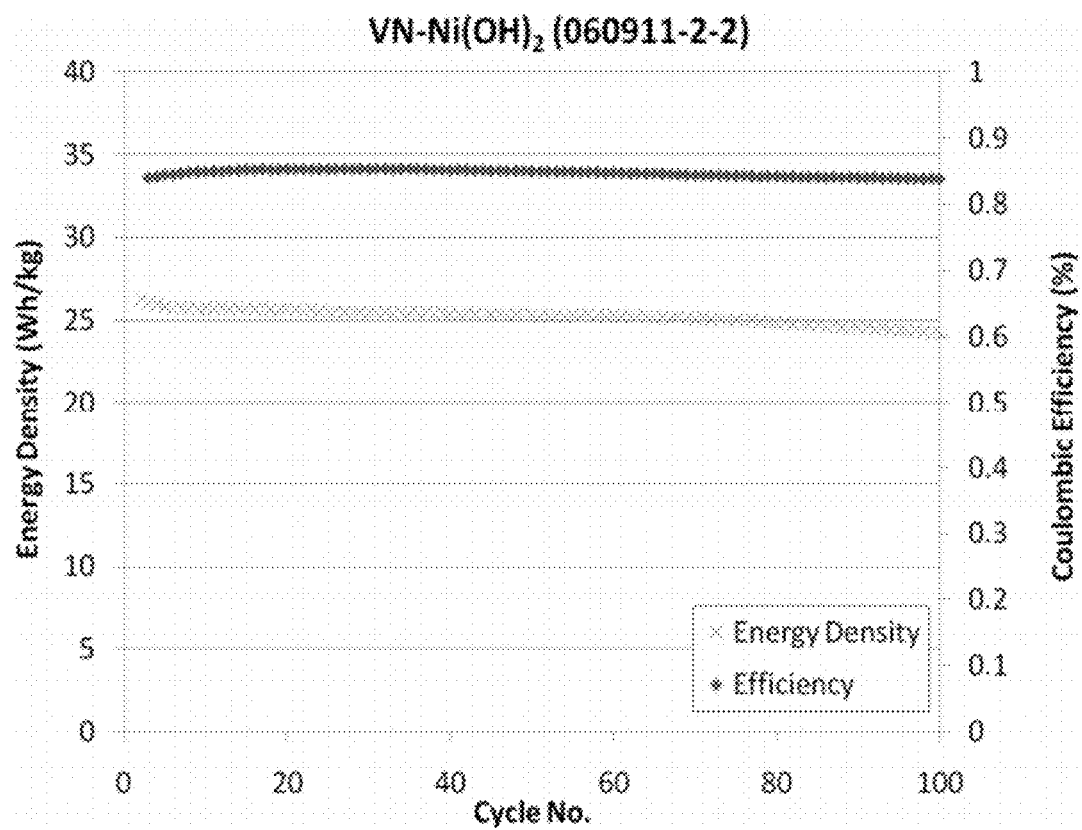
FIG. 11 is a cycling data graph for a VN—$Ni(OH)_2$ asymmetric button cell in accordance with an embodiment of the disclosure.

FIG. 11 illustrates the cycling of a VN—$Ni(OH)_2$ cell. The cell was cycled form 0.1 V to 1.7 V at a constant current of 5 mA. Both FIGS. 10 and 11 further demonstrate that the supercapacitors in accordance with embodiments of the disclosure are capable of exceeding the energy densities achieved by conventional highly optimized carbon systems (FIG. 9b).

Asymmetric supercapacitors in accordance with embodiments of the disclosure can be used in a variety of applications, including, for example, military applications. For example, the supercapacitors can be used for powering devices for the modern soldier and exoskeleton system for Human Universal Load Carrier (HULC), powering electromagnetic armor, and extended range vehicles. The supercapacitors of the disclosure can also be used in the automotive industry, for example, in acceleration boost and regenerative braking for cars and trucks. The supercapacitors of the disclosure can also be used in advanced auxiliary power units and buffering for peak power associated with renewable energy sources, such as wind turbines.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:
1. An asymmetric supercapacitor comprising:
   a first electrode comprising a first active material and having a first operating window, wherein the first active material comprises a material selected from the group consisting of a metal oxynitride, a metal oxycarbide, a metal oxyboride, and combinations thereof, and the metal is selected from the group consisting of Groups III, IV, V, VI, or VII of the Periodic Table;

a second electrode comprising a second active material and having a second operating window, wherein the first and second operating windows overlap by 0%, based on voltage;

a separator disposed between the first and second electrodes; and an aqueous electrolyte.

2. The asymmetric supercapacitor of claim 1, wherein a total operating window for the supercapacitor is greater than 1.4 V.

3. The asymmetric supercapacitor of claim 1, wherein a total operating window for the supercapacitor is in a range of 1.5 V to 2.2 V.

4. The asymmetric supercapacitor of claim 1, wherein the first active material is a pseudocapacitive material.

5. The asymmetric supercapacitor of claim 4, wherein the second active material is an electrical double layer capacitive material.

6. The asymmetric supercapacitor of claim 1, wherein the second active material is a metal oxide, and the metal of the metal oxide is different than the metal of the first active material.

7. The asymmetric supercapacitor of claim 1, wherein the second active material has a high over-potential for oxygen evolution.

8. The asymmetric supercapacitor of claim 1, wherein the second active material is selected from the group consisting of manganese oxide, cobalt oxide, and nickel oxyhydroxide.

9. The asymmetric supercapacitor of claim 8, wherein the second active material is manganese oxide.

10. The asymmetric supercapacitor of claim 1, wherein the electrolyte is basic.

11. The asymmetric supercapacitor of claim 1, wherein the second active material is ruthenium oxide.

12. The asymmetric super capacitor of claim 1, wherein the electrolyte is acidic.

13. The asymmetric supercapacitor of claim 1, wherein the electrolyte is selected from the group consisting of potassium hydroxide, sodium hydroxide, ammonium hydroxide, lithium hydroxide, aqueous sulfuric acid, aqueous nitric acid, and aqueous phosphoric acid.

14. The asymmetric supercapacitor of claim 1, wherein at least one of the first active material and the second active material is porous.

15. The asymmetric supercapacitor of claim 1, wherein at least one of the first active material and the second active material has a pore size of about 2 nm to about 50 nm.

16. The asymmetric supercapacitor of claim 1, wherein the first active material has a specific surface area of about 40 $m^2/g$ or greater.

17. The asymmetric supercapacitor of claim 1, wherein the first active material has a specific surface area of about 100 $m^2/g$.

* * * * *